Figure 1:
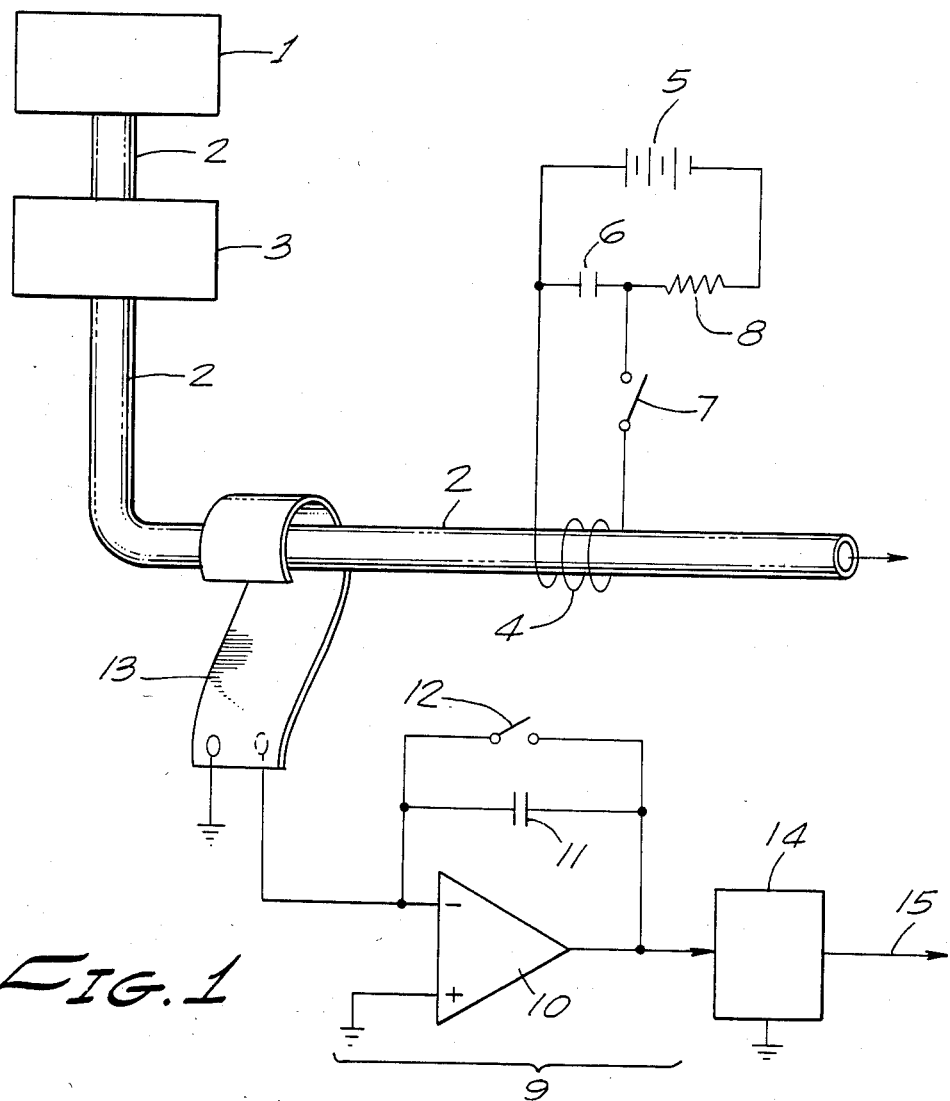

United States Patent [19]

Renger

[11] Patent Number: 4,555,940
[45] Date of Patent: Dec. 3, 1985

[54] METHOD AND APPARATUS FOR MEASURING FLUID FLOW RATES AND VOLUMES THROUGH FLUID FLOW PATHS

[76] Inventor: Herman L. Renger, 2790 Stokes Canyon Rd., Calabasas, Calif. 91302

[21] Appl. No.: 438,356

[22] Filed: Nov. 1, 1982

[51] Int. Cl.[4] .............................................. G01F 1/68
[52] U.S. Cl. ...................................... 73/204; 604/246
[58] Field of Search .................. 73/204; 128/691, 713, 128/DIG. 12, DIG. 13; 604/65, 245, 246

[56] References Cited

U.S. PATENT DOCUMENTS

| | | | |
|---|---|---|---|
| 3,438,254 | 4/1969 | Seeley | 73/204 |
| 3,519,924 | 7/1970 | Burton | 73/204 |
| 3,922,912 | 12/1975 | Bradbury | 73/204 |
| 4,332,157 | 6/1982 | Zemel et al. | 73/204 |
| 4,384,578 | 5/1983 | Winkler | 128/DIG. 13 |

Primary Examiner—Herbert Goldstein
Attorney, Agent, or Firm—Robert R. Meads

[57] ABSTRACT

A system for measuring and for monitoring pulsed and steady state fluid flow through fluid flow paths includes a device for modifying the temperature of part of the flow path and a device for pyroelectrically detecting changes in temperature as fluid flows through the temperature-modified part of the flow path.

17 Claims, 2 Drawing Figures

METHOD AND APPARATUS FOR MEASURING FLUID FLOW RATES AND VOLUMES THROUGH FLUID FLOW PATHS

This invention relates to methods and apparatus for measuring and for monitoring the volume and rate of fluid flow through a fluid flow path. These methods and apparatus are particularly useful for measuring and for monitoring liquid flow rates and volumes in medical devices that pump liquids carrying medication into patient's bloodstreams, spinal fluids, brains lymph glands and other organisms in the human body.

The new fluid flow rate and volume measuring and monitoring apparatus includes means for modifying the temperature of a part of the fluid flow path and means including pyroelectric detector for detecting or measuring changes in temperature of said fluid flow path and of the fluid as the fluid passes through the temperature-modified part of the fluid flow path. These means can be joined to the outside of the fluid flow path without penetrating into the path, and without impeding fluid flow through the path.

These new apparatus are especially effective for measuring liquid flow rates and liquid flow volumes through liquid flow paths of many different kinds and diameters, whether enclosed or otherwise, but are particularly effective with tubular flow paths having a diameter in the range of about 0.1 millimeter to about 5 millimeters. The new apparatus measures and monitors both continuous liquid flow and intermittent pulsed liquid flow.

These apparatus work effectively over a wide range of fluid flow rates and volumes, but are particularly effective in measuring flow volumes in the range of about 0.0001 to about one milliliter of liquid, and in the range of about one milliliter to about one liter of gas, and in measuring flow rates in the range of about 0.001 milliliter per second to about 100 milliliters per second of liquid and about one milliliter per second to about one liter per second of gas.

The new apparatus are useful for measuring liquid and gas flow rates and flow volumes over wide ranges of temperature and pressure. Over temperature ranges of about $-40°$ C. to about $100°$ C., and pressure ranges of atmospheric to about 100 atmospheres, we can monitor and measure flow rates and volumes practicably.

Where my apparatus is part of an implanted or portable medical device, or of any other device with tubular flow paths that are relatively small in diameter, say in the range of about 0.1 to about 5 millimeters in diameter, my apparatus can verify the performance of such devices, warn of impending or existing unwanted changes in the rate of volume of flow, serve as a feedback system for monitoring flow at a desired rate or volume, detect bubbles, or some combination of these purposes. My new system can also be incorporated in devices other than medical devices.

My new apparatus includes means for modifying the temperature of a part of a fluid flow path. This means can be a device such as a solid-state heat pump that can raise or lower the temperature of part of a flow path and the fluid passing through that part. Where the flow path is tubular or is otherwise enclosed, the temperature-modifying means may be a heat pump mounted on the outside of the path, and a fixed amount of heat may then be delivered to, or withdrawn from the tubular path and the fluid in the path. If the fluid is flowing continuously, then a series of such fixed amounts may be delivered or withdrawn from the flow path and the fluid therein. After a fixed amount is delivered, and the temperature of the path and the fluid therein have been sufficiently modified, the temperature change detector means, which includes pyroelectric means, is activated. The detector monitors temperature changes that take place as fluid flows through the temperature-modified portion of the flow path.

Although the temperature-modifying means can be means for heating or cooling the fluid flow path and the fluid within that path, the temperature-modifying means is preferably a means for raising the temperature of the fluid flow path and fluid therein above the temperature of the fluid at its source. Resistive heaters, heat pumps and other heat generators can be used for this purpose.

My new apparatus also includes means for detecting changes in temperature as a function of fluid flow rates and volumes through the temperature-modified portion of the fluid flow path. This means includes pyroelectric detector means such as pyroelectrically-sensitive polyvinylidene fluoride film. Pyroelectrically-sensitive film of this kind can be wrapped around the fluid flow path. Suitable pyroelectric sensors preferably produce in the range of about 5 about 20 microcoulombs per square meter of film area per degree Kelvin. The pyroelectric detector means must be in sufficiently close proximity to the temperature-modifying means to detect temperature changes reliably as the fluid flows through the temperature-modified portion of the fluid flow path. Preferably, the pyroelectrically-sensitive detector is joined to, and even wrapped around the fluid flow path. Preferably, the detector is positioned upstream of the temperature-modifying means. However, the detector may be placed downstream of, or at the same location as the temperature-modifying means, say on the opposite side of the flow path from the temperature-modifying means. Where pyroelectrically-sensitive polyvinylidene fluoride film constitutes the pyroelectric means, the metal film electrode on the pyroelectric film itself can also serve as temperature-modifying means.

In alternative embodiments, my new system can include three separate detector means. The temperature-modifying means may be adapted to deliver a fixed quantity of heat, to change the temperature of the fluid flow path by a fixed amount for a fixed period of time, or simply to stop when a fixed temperature change has been attained.

Preferably, we treat the temperature of the fluid flow passage before temperature modification begins as our reference or zero point. We then modify the temperature of the fluid flow passage to a desired level, before flow begins, and detect the temperature change from our zero Point. After fluid flow takes place through the temperature-modified portion of the fluid passage, we detect the resulting temperature change caused by the flow.

Alternatively, we may adjust our system to deliver a fixed amount of heat to, or remove a fixed amount of heat from the fluid flow passage. As an example, and referring to the temperature waveform shown in FIG. 2, we can then measure the temperature change before flow begins and after flow takes place. We then compute the ratio of the two changes, which cancels errors resulting from changes in the temperature modification and temperature-measuring systems.

My new system not only measures continuous or pulsed flow, but can also detect bubbles or incipient interruptions in fluid flow. By measuring both the initial flow rate and total flow, my system can detect incipient flow interruption before such interruption alters total flow. My system measures the temperature change from just after fluid flow begins to just after fluid flow has ended. Because the thermal capacity of bubbles is far lower than the thermal capacity of liquids, the temperature-modified portion of the liquid flow path will increase in temperature when bubbles pass through from the temperature where only liquid is flowing through the passage if the amount of heat transferred or removed from the temperature-modified portion of the fluid flow passage remains substantially unchanged.

Where the means for detecting temperature change is a pyroelectric film such as pyroelectrically-sensitive polyvinylidene fluoride (e.g., Pennwalt Corporation's KYNAR film), my system includes a means for zeroing the charge converter, preferably an operational amplifier with a feedback capacitor. In operation, the preferred embodiment of my apparatus will zero the means for detecting temperature change just before temperature modification of the fluid flow path takes place. Alternatively, a voltage follower can be utilized instead of the charge-converting amplifier. Both amplifier and follower can be dispensed with if the comparator or analog-to-digital converter has a high impedance.

Figure 2:
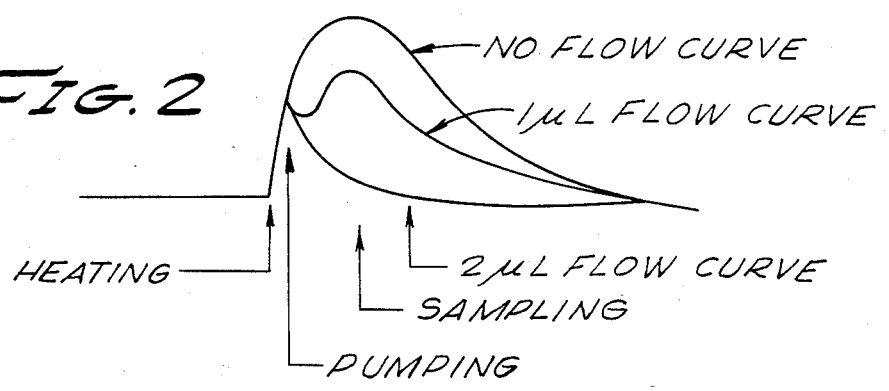

My new apparatus and methods can better be understood by reference to the drawings in which:

FIG. 1 is a schematic of a pulsed liquid flow system including my new apparatus for measuring and monitoring liquid flow through a tubular flow path; and FIG. 2 is a graph showing the detected changes in temperature of the temperature-modified part of the liquid flow path as liquid flows through that part.

In FIG. 1, pump 3 periodically pulses liquid from reservoir 1 through tubular flow path 2. Under the control of a microprocessor (not shown), which controls the overall pumping and liquid flow operation, resistive heater means 4 delivers a fixed quantity of heat to flow path 2. Resistive heater 4, which surrounds flow path 2, includes battery means 5, capacitor 6, switch 7 and recharge resistor 8. Before liquid from reservoir 1 is pumped through passage 2, the microprocessor zeros the charge in intergrating capacitor 11 using switch 12, which is closed briefly, then opened, by the microprocessor. Then after a short time interval, the microprocessor closes switch 7, and resistance heater means 4 delivers a fixed amount of energy from capacitor 6 to the part of flow path 2 that heater 4 surrounds, and to the fluid inside this part as well.

Film 13 is wrapped around flow path 2 upstream of heater 4, but is sufficiently close to heater 4 to reliably detect temperature changes in the temperature-modified (heated) part of the flow passage 2 surrounded by heater 4.

To measure total fluid flow, we measure the temperature of the temperature-modified portion of the fluid flow passage after flow takes place. In other words, we first modify the temperature of a portion of the fluid flow path, and then allow some time for the temperature modification to affect both the fluid flow passage and the liquid or gas inside the passage. We must then promptly initiate fluid flow through the temperature-modified portion of the passage to preclude extending the temperature modification beyond the desired part of the flow path, at least in the case of pulsed flow. Promptly after flow takes place, but before the temperature change attenuates, we measure the temperature change resulting from flow through the temperature-modified portion of the passage. Of course, temperature measurements may be made just before and after fluid flow takes place.

In FIG. 2, the graph shows that, as heater 4 delivers heat to a part of flow passage 2, the temperature of that part rises. As reservoir liquid lower in temperature than the heated part begins to flow through the heated part, the temperature falls in direct proportion to the increase in the fluid flow rate through that part. A short time after heating, the output 15 from amplifier sampler 14 momentarily interprets the temperature change as a measure of the change in flow rate or flow volume, and provides an accurate measure of one or both.

What is claimed is:

1. A system for measuring and for monitoring fluid flow in a fluid flow path comprising means for intermittently modifying the temperature of part of said fluid flow path by utilizing a predetermined amount of energy and means including pyroelectrically-sensitive detector means for measuring and for monitoring changes in temperature in said temperature-modified part of said fluid flow path and said fluid in response to said utilized predetermined amount of energy as fluid flows through said temperature-modified part.

2. The system of claim 1 wherein said fluid is a liquid.

3. The system of claim 1 or claim 2 wherein the temperature-modifying means heats the fluid flow path to a temperature above the temperature of the fluid at its source.

4. The system of claim 3 wherein said fluid flow path is enclosed, said detector means is joined to said fluid flow path, and said temperature-modifying means is joined to said path downstream of said detector means.

5. The system of claim 1 or claim 2 wherein the fluid flow path is enclosed, said detector means is joined to said fluid flow path, and said temperature-modifying means is joined to said path upstream of said detector means.

6. The system of claim 1 or claim 2 wherein the fluid flow path is enclosed, said detector means is joined to said flow path, and said temperature-modifying means is joined to said path coincident with said detector means.

7. The system of claim 1 or claim 2 wherein the fluid flow path is enclosed, said detector means is joined to said flow path, and said temperature-modifying means is joined side by side with said detector means.

8. A method for measuring and for monitoring fluid flow in a fluid flow path comprising intermittently modifying the temperature of part of said fluid flow path utilizing a predetermined amount of energy, and pyroelectrically detecting and measuring the changes in temperature in said temperature-modified part of said fluid flow path in response to said utilized predetermined amount of energy as liquid flows through said path.

9. The method of claim 8 wherein said fluid is liquid.

10. The method of claim 8 or claim 9 wherein the temperature modification comprises raising the temperature of said fluid flow path above the temperature of the fluid at its source.

11. The method of claim 8 wherein said fluid flow path is enclosed.

12. The method of claim 8 or claim 9 or claim 11 comprising modifying the temperature downstream of said detecting and measuring.

13. The method of claim 8 or claim 9 or claim 11 comprising modifying the temperature upstream of said detecting and measuring.

14. The method of claim 8 or claim 9 or claim 11 comprising modifying the temperature coincident with said detecting and measuring.

15. The method of claim 8 or claim 9 or claim 11 comprising modifying the temperature side by side of said detecting and measuring.

16. A system for measuring and for monitoring fluid flow in a fluid flow path comprising means for modifying the temperature of part of said fluid flow path by utilizing a predetermined amount of energy while fluid in said path is static, means for initiating a fluid pumping cycle after the temperature in said part of said fluid flow path has been modified, means including pyroelectrically-sensitive detector means for measuring and for monitoring changes in temperature in said temperature-modified part of said fluid flow path and said fluid after said pumping cycle has been initiated.

17. A method for measuring and for monitoring fluid flow in a fluid flow path comprising modifying the temperature of part of said fluid flow path utilizing a predetermined amount of energy while fluid in said path is not flowing, initiating a fluid pumping cycle, pyroelectrically detecting and measuring the changes in temperature of said fluid and said fluid flow path after said pumping cycle has been initiated, and determining fluid flow through said fluid flow path according to said measured temperature change.

* * * * *